United States Patent Office 3,405,873
Patented Oct. 15, 1968

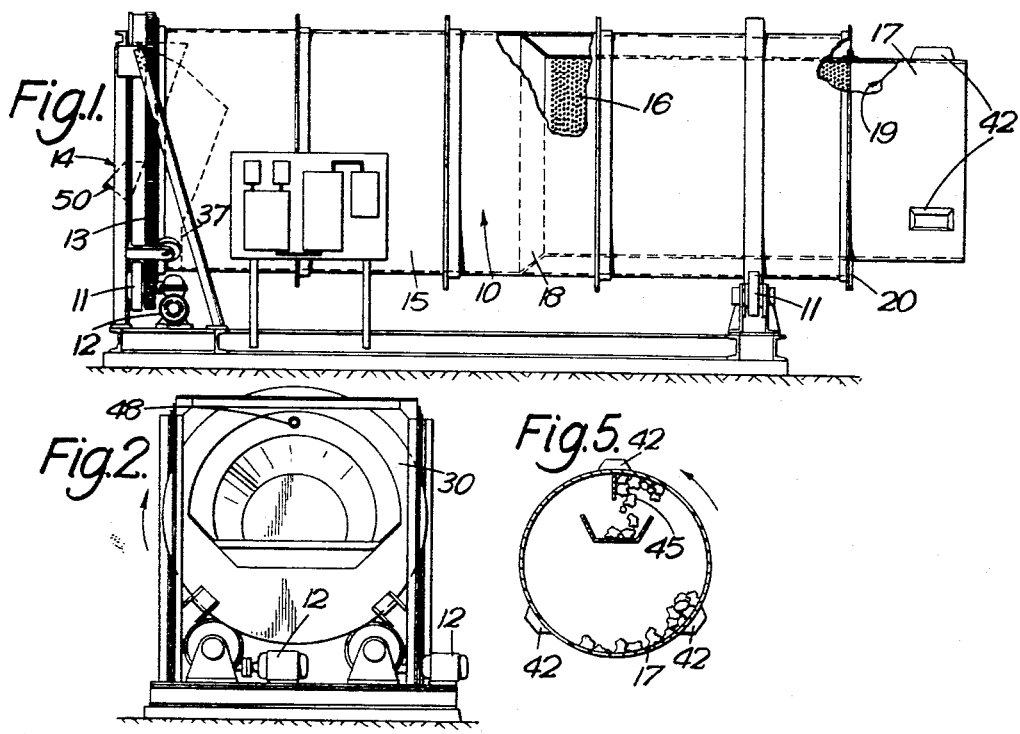

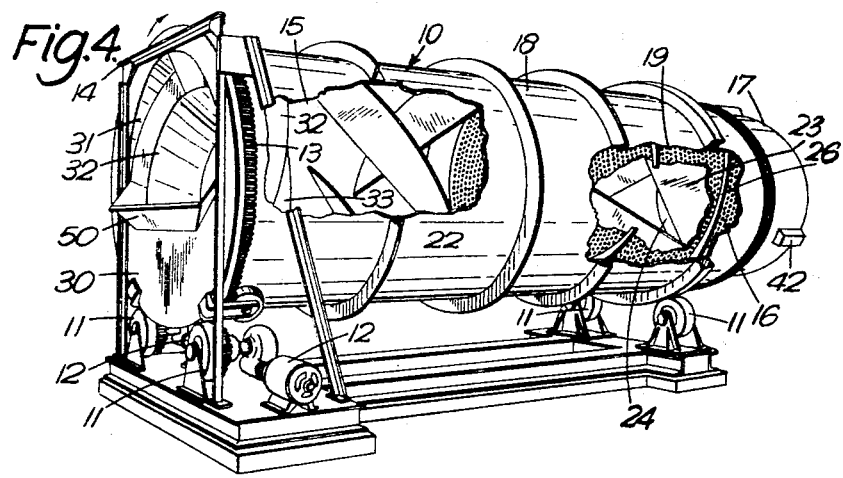
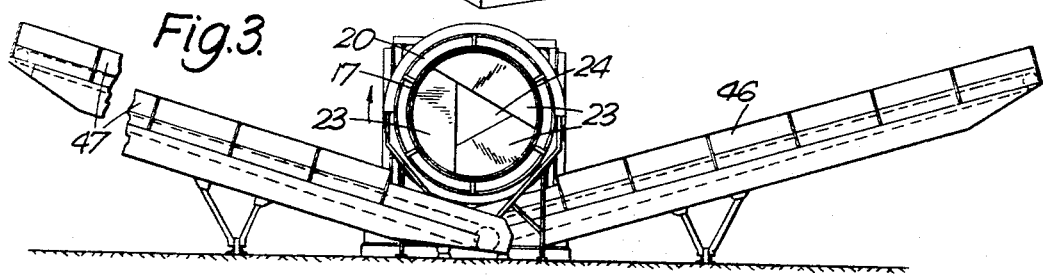

3,405,873
REFUSE TREATING APPARATUS
Sydney Averill Gothard, St. Saviour, Jersey, Channel Islands, and Donald Frank Rees, Wentworth, Surrey, and Laurence Parker Brunt, London, England, assignors to Vickers Seerdrum Limited, London, England, a British company
Filed Dec. 6, 1965, Ser. No. 511,909
Claims priority, application Great Britain, Dec. 7, 1964, 49,604/64
10 Claims. (Cl. 241—38)

ABSTRACT OF THE DISCLOSURE

An apparatus for treating refuse wherein a drum is mounted for rotation about a generally horizontal axis. A feeder device is provided for feeding refuse into the drum through an inlet at one end. A portion of the drum wall spaced along the length of the drum from its inlet is perforated for separation of refuse pulverized by rotation of the drum and an outlet opening is provided on the side of the perforated portion remote from the inlet, there being vanes within the drum in the region of the perforated portion and disposed obliquely to the axis of the drum in a sense to urge the refuse back toward the inlet as the drum rotates.

---

The invention relates to apparatus and a method for the treatment of town's refuse by which the refuse is pulverised and non-pulverisable material (e.g. cans and rags) is separated, as rejects, in a substantially continuous manner.

The invention provides apparatus for the treatment of refuse, comprising a drum mounted for rotation about its axis, said axis being horizontal or slightly inclined to the horizontal, and means for effecting such rotation, said drum having at one end an inlet for refuse, a portion of the wall of the drum intermediate in the length of the drum perforated for seperation of refuse pulverised by rotation of the drum, an outlet opening at a position along the length of the drum on the side of the perforated portion remote from the inlet for discharge of rejects and vanes within said drum in the region of, or beyond, said perforated portion oblique to the axis of the drum in the sense to tend, as the drum rotates, to feed back towards the inlet refuse displaced from the inlet towards said outlet opening.

In one form of the apparatus the drum also has vanes in the region between the inlet and the perforated portion and these vanes also may be oblique in the sense to feed refuse back towards the inlet.

The apparatus may have means for adding water to the refuse at or adjacent the inlet opening.

The invention also provides the method of treating refuse, which comprises feeding the refuse into one end of a drum, adding water to bring the refuse to a predetermined moisture content, rotating the drum to effect pulverisation of the refuse by a tumbling action, constantly feeding back towards the inlet end a proportion of the refuse while permitting the remainder to be displaced by incoming refuse and to progress towards the other end of the drum and separating from the refuse during such progression pulverulent material leaving rejects, the pulverulent material and the rejects being discharged separately from the drum.

A specific construction of refuse treating apparatus according to the invention and its method of operation will now be described, by way of example, with reference to the accompanying drawings, in which:

FIGURE 1 is an elevation of the apparatus,

FIGURE 2 shows the inlet end of the apparatus,

FIGURE 3 shows the discharge end of the apparatus, and includes discharge conveyors, FIGURE 4 is a perspective view, partly broken away, of the apparatus, omitting the conveyors, and FIGURE 5 is a diagram showing a magnetic separator.

The apparatus comprises a drum 10 supported on rollers 11 for rotation about a horizontal axis, rotation being effected by two motors 12, driving a gear ring 13 on the drum. At the inlet end, 14, the cylindrical walls of the drum are imperforate as seen at 15. Intermediate in the length of the drum there is a portion 16 in which the drum is of reduced internal diameter and the walls are perforated. This is followed by an open-ended plain portion 17 of substantially the same reduced diameter.

Around the perforated portion there is an outer shell 18 formed by a continuation of the portion 15. The space 19 between the shell and inner perforated portion is open at one end 20.

Within the portion 15 there are eight flat vanes or blades 22 oblique to the axis of the drum, the outer edges of the blades being elliptical to fit the drum and the inner edges being straight. The blades—which are shown diagrammatically in FIGURE 4—are spaced in pairs around the drum axis and the pairs are spaced apart in the axial direction. There are six similar and similarly arranged blades 23 in the perforated portion, followed by three similar blades 23 without axial spacing. The blades 23 are of greater radial depth than the blades 22 and both sets of blades leave the centre of the drum cross-section clear, see the triangle 24 in FIGURE 3.

In the space 19 there are helical blades or screws 26 which the helix angel is of the opposite hand to the angle of the blades 22, 23.

At the inlet end 14 of the drum there is a non-rotating feeder device 30 which, per se, forms no part of the present invention.

The portion 17 of the drum is of non-magnetic material and carries permanent magnets 42. As seen in FIGURE 5 there is a discharge chute 43 within the portion 17 and a fixed scraper bar 44, arranged to knock off into the chute articles, 45, e.g. cans, of magnetic material carried round by the magnets as the drum rotates.

As seen in FIGURE 3 there are two discharge conveyors 46, 47 at the outlet end of the drum. The conveyor 46 is arranged to receive and remove material from the open end 20 while the conveyor 47 receives and removes rejects from the open end of the portion 17.

There is also a motor which drives a water pump (not shown) which delivers measured quantities of water through a nozzle 48 into the drum.

The drum rotates in the direction of the arrows in FIGURES 2 and 4.

In use town's refuse is fed (e.g. by grab, conveyor, shovel or other means) into a chute 50 at the inlet. The refuse is then carried upwardly by the blades 22 and until it falls back onto the bottom of the drum, so that it is pulverised by a tumbling action. Due to the inclination of the blades, the refuse is urged back towards the inlet and therefore remains in the pulverising section until forced by incoming refuse over the blades 22 into the perforated portion of the drum. Here also there is a tumbling action and return towards the inlet by the blades 23. Refuse which is pulverised passes through the perforations into the space 19 whence it is fed by the screw action of blades 26 to the outlet 20 and onto the conveyor 46. Material which will not pulverise is eventually forced over the blades 23 to the outlet formed by the open end of portion 17 where it falls, as rejects, onto conveyor 37.

Water is added through the nozzle 48 to maintain the moisture content of the refuse in the region of 40–45% by weight. The amount of water required depends, of course, on the initial content of the refuse.

We claim:
1. Apparatus for the treatment of refuse, comprising a drum mounted for rotation about its axis, said axis being substantially horizontal and means for effecting such rotation, said drum having at one end an inlet for refuse, a feeder device at said inlet for feeding refuse thereinto, a portion of the wall of the drum spaced along the length of the drum from said inlet being perforated for separation of refuse pulverised by rotation of the drum, an outlet opening at a position along the length of the drum on the side of the perforated portion remote from the inlet for discharge of rejects and vanes within said drum in the region of said perforated portion oblique to the axis of the drum in the sense to tend, as the drum rotates, to feed back towards the inlet refuse displaced from the inlet towards said outlet opening.

2. Apparatus as claimed in claim 1 in which the drum also has internal vanes in the region between the inlet and the perforated portion.

3. Apparatus as claimed in claim 2 in which said vanes are also oblique to the axis of the drum in the sense to tend to feed refuse back towards the inlet.

4. Apparatus as claimed in claim 1 in which the radial depth of the vanes is less than the radius of the drum to leave a central portion of the drum cross section unobstructed.

5. Apparatus as claimed in claim 4 in which the drum also has internal vanes in the region between the inlet and the perforated portion and in which the radial depth of these vanes is less than that of the vanes in the region of the perforated portion.

6. Apparatus as claimed in claim 1 having means for adding water to the refuse at or adjacent the inlet opening.

7. Apparatus as claimed in claim 1 in which the drum has an outer shell around the perforated portion and there are screw conveyor means between the portion and shell for feeding pulverised material passing outwardly through the perforations to a discharge opening at one end of the shell.

8. Apparatus as claimed in claim 1 and including conveyors for removing separately pulverised material and rejects discharged from the drum.

9. Apparatus as claimed in claim 1 in which a portion of the drum in the region of the outlet opening is of non-magnetic material, and carries one or more magnets operable to attract magnetic components of the refuse and, as the drum rotates, to carry them upwardly over a separate discharge conveyor, means being provided for detaching the components to drop into the conveyor.

10. Apparatus for the treatment of refuse, comprising a cylindrical drum mounted for rotation about its axis, said axis being substantially horizontal, and means for effecting such rotation in one direction, said drum having in one end wall an inlet for refuse, a portion of the cylindrical wall of the drum intermediate in the length of the drum perforated for separation of refuse pulverised by rotation of the drum, an outlet opening at the other end of the drum, vanes within the portion of the drum between said one end wall and the perforated portion and also within the perforated portion, said vanes being oblique to the axis of the drum in the sense to tend, as the drum rotates in the said one direction, to feed back towards the inlet refuse displaced from the outlet towards the outlet opening, means for feeding water into the drum adjacent the inlet end, a shell around and separated from the perforated portion, to leave an annular space between the shell and said portion, a closure for one end of said space, the other end being open, a screw within said space tending to feed material entering the space through the perforations towards the open end, and separate conveyors for receiving and removing material from said open end and from said outlet opening respectively.

References Cited
UNITED STATES PATENTS

| | | | |
|---|---|---|---|
| 2,809,789 | 10/1957 | Roubal | 241—183 |
| 2,950,870 | 8/1960 | Danyluke | 241—91 |
| 2,964,184 | 12/1960 | Gillette. | |
| 843,466 | 2/1907 | Krickbaum | 241—91 |
| 1,043,349 | 11/1912 | Ostwald | 241—172 |
| 2,069,164 | 1/1937 | Vogel-Jorgensen | 241—172 |
| 2,695,221 | 11/1954 | Klugh | 241—91 |
| 2,721,035 | 10/1955 | Lankford | 241—91 |
| 3,018,059 | 1/1962 | Lodige | 241—172 |

FOREIGN PATENTS

| | | |
|---|---|---|
| 548,853 | 11/1930 | Germany. |
| 416,869 | 9/1934 | Great Britain. |

ANDREW R. JUHASZ, *Primary Examiner.*